(12) United States Patent
Tomoda

(10) Patent No.: US 11,704,392 B2
(45) Date of Patent: Jul. 18, 2023

(54) FRAUD ESTIMATION SYSTEM, FRAUD ESTIMATION METHOD AND PROGRAM

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 269 days.

(21) Appl. No.: 17/056,755

(22) PCT Filed: Jun. 26, 2019

(86) PCT No.: PCT/JP2019/025365
§ 371 (c)(1),
(2) Date: Nov. 18, 2020

(87) PCT Pub. No.: WO2020/261425
PCT Pub. Date: Dec. 30, 2020

(65) Prior Publication Data
US 2021/0264001 A1   Aug. 26, 2021

(51) Int. Cl.
*G06F 21/31* (2013.01)
(52) U.S. Cl.
CPC .................. *G06F 21/31* (2013.01)
(58) Field of Classification Search
CPC ..... G06F 21/31; G06F 21/6218; G06Q 30/00; G06Q 20/4016; G06Q 20/12; G06N 5/04; G06N 20/00; G06N 3/08; H04L 63/10; H04L 63/1416
See application file for complete search history.

(56) References Cited

U.S. PATENT DOCUMENTS

| 10,977,653 | B2 * | 4/2021 | Wiese | G06Q 20/1085 |
|---|---|---|---|---|
| 2012/0278246 | A1 | 11/2012 | Boding et al. | |
| 2014/0250011 | A1 * | 9/2014 | Weber | G06Q 20/4016 705/44 |
| 2015/0348042 | A1 * | 12/2015 | Jivraj | G06Q 20/326 705/44 |
| 2016/0292692 | A1 | 10/2016 | Hammad | |

(Continued)

FOREIGN PATENT DOCUMENTS

| CN | 109615389 A | 4/2019 |
|---|---|---|
| JP | 2001-325439 A | 11/2001 |

(Continued)

OTHER PUBLICATIONS

Search Report dated Sep. 13, 2021, for corresponding EP Patent Application No. 19928300.3.

(Continued)

*Primary Examiner* — Tongoc Tran
(74) *Attorney, Agent, or Firm* — HEA Law PLLC

(57) ABSTRACT

Relevance information obtaining means of a fraud estimation system is configured to obtain relevance information about relevance between one service and another service. Comparison result obtaining means is configured to obtain a comparison result of a comparison between user information of a target user in the one service and user information of a fraudulent user or an authentic user in the another service. Estimation means is configured to estimate fraudulence of the target user based on the relevance information and the comparison result.

13 Claims, 12 Drawing Sheets

(56) References Cited

U.S. PATENT DOCUMENTS

| | | | |
|---|---|---|---|
| 2017/0140382 A1* | 5/2017 | Chari | G06Q 20/389 |
| 2020/0065814 A1* | 2/2020 | Fang | G06Q 20/4014 |
| 2021/0012346 A1* | 1/2021 | Walters | G06F 16/9024 |

FOREIGN PATENT DOCUMENTS

| | | |
|---|---|---|
| JP | 2016-099913 A | 5/2016 |
| JP | 2018-045573 A | 3/2018 |

OTHER PUBLICATIONS

Office Action dated Jul. 14, 2020 for corresponding JP Application No. 2020-505291 with partial translations.

\* cited by examiner

FIG.4

| USER ID | NAME | ADDRESS | PHONE NUMBER | BIRTH DATE | CARD INFORMATION | IP ADDRESS | DEVICE ID |
|---|---|---|---|---|---|---|---|
| a00001 | TARO YAMADA | .... MINATO-KU, TOKYO | 090-1111-2222 | 1980/5/25 | 4018-7123-0171-3124 | 192.168.75.75 | d00004 |
| a00002 | HANAKO TANAKA | .... YOKOHAMA, KANAGAWA | 070-3333-4444 | 1972/4/2 | 2018-3404-7410-1421 | 192.168.105.66 | d01291 |
| a00003 | JIRO OKAMOTO | .... URAWA, SAITAMA | 048-5555-6666 | 1985/10/14 | 3315-5014-3232-1951 | 165.162.56.45 | d05291 |
| ... | ... | ... | ... | ... | ... | ... | ... |

| USER ID | NAME | ADDRESS | PHONE NUMBER | BIRTH DATE | CARD INFORMATION | IP ADDRESS | DEVICE ID |
|---|---|---|---|---|---|---|---|
| b00001 | KYOKO IKEDA | ... ITABASHI-KU, TOKYO | 03-7777-8888 | 1990/7/8 | 8913-4701-4174-5110 | 168.25.122.41 | d52192 |
| b00002 | KAZUO SAKAMOTO | ... SETAGAYA-KU, TOKYO | 03-9999-0000 | 1968/12/20 | 0012-8901-3001-2322 | 172.53.25.83 | d48032 |
| b00003 | NAOKO OKAWA | ... SAPPORO, HOKKAIDO | 080-2121-3232 | 1995/1/5 | 4208-2414-7520-6659 | 132.92.156.145 | d15822 |
| ... | ... | ... | ... | ... | ... | ... | ... |

| USER ID | DEVICE ID |
|---------|-----------|
| b00005  | d00031    |
| b00031  | d01928    |
| b00183  | d00812    |
| ⋮       | ⋮         |

BLb

FIG.8

| USER ID | NAME | ADDRESS | PHONE NUMBER | BIRTH DATE | CARD INFORMATION | IP ADDRESS | DEVICE ID |
|---|---|---|---|---|---|---|---|
| c00001 | SADAKO ABE | ..., NAHA, OKINAWA | 090-1414-5656 | 2000/4/3 | 6472-0193-2241-5512 | 98.125.26.141 | d88190 |
| c00002 | MASAO TAKAYAMA | ..., OSAKA, OSAKA | 080-9191-4242 | 1954/2/15 | 1212-3958-5781-4108 | 168.168.25.83 | d03721 |
| c00003 | TARO YAMADA | ..., MINATO-KU, TOKYO | 090-1111-2222 | 1980/5/25 | 4018-7123-0171-3124 | 192.168.75.75 | d00004 |
| ... | ... | ... | ... | ... | ... | ... | ... |

| COMBINATION | | RELEVANCE INFORMATION |
|---|---|---|
| CARD NUMBER OF SERVICE A | CARD NUMBER OF SERVICE C | 0.8 |
| CARD NUMBER OF SERVICE B | CARD NUMBER OF SERVICE C | 0.3 |
| USER ID OF SERVICE A | CARD NUMBER OF SERVICE A | 0.9 |
| USER ID OF SERVICE B | DEVICE ID OF SERVICE B | 0.1 |
| USER ID OF SERVICE B | CARD NUMBER OF SERVICE B | 0.6 |

DB2

FRAUD ESTIMATION SYSTEM, FRAUD ESTIMATION METHOD AND PROGRAM

CROSS REFERENCE TO RELATED APPLICATIONS

This application is a National Stage of International Application No. PCT/JP2019/025365 filed on Jun. 26, 2019. The contents of the above document are incorporated herein by reference in its entirety.

TECHNICAL FIELD

The one embodiment of the present invention relates to a fraud estimation system, a fraud estimation method, and a program therefor.

BACKGROUND ART

Hitherto, technologies for estimating a user's fraudulence in services provided on the Internet or via other measures have been studied. In Patent Literature 1, for instance, there is described estimation of the credit quality of a user who wishes to newly sign up in a system configured to manage a blacklist of users who are considered to be fraudulent, by obtaining a website browsing history and other action histories of the user who wishes to newly sign up and comparing the obtained histories to action histories of the users on the blacklist.

CITATION LIST

Patent Literature

[PTL 1] JP 2018-045573 A

SUMMARY OF INVENTION

Technical Issue

However, various tendencies are observed in activities of users who commit fraudulence and, consequently, the action histories of a user who wishes to newly sign up and who may commit fraudulence do not always resemble the action histories of the users on the blacklist. With the technology of Patent Literature 1, only users whose activities resemble those of the users on the blacklist are detectable, and the precision of fraud estimation cannot be raised to a satisfactorily high level.

The one embodiment of the present invention has been made in view of the issue described above, and an object of the one embodiment of the present invention is therefore to provide a fraud estimation system, a fraud estimation method, and a program, which enable estimation precision to be raised.

Solution to Issue

In order to solve the above-mentioned issue, according to one embodiment of the present invention, there is provided a fraud estimation system including: relevance information obtaining means for obtaining relevance information about relevance between one service and another service; comparison result obtaining means for obtaining a comparison result of a comparison between user information of a target user in the one service and user information of a fraudulent user or an authentic user in the another service; and estimation means for estimating fraudulence of the target user based on the relevance information and the comparison result.

According to one embodiment of the present invention, there is provided a fraud estimation system including: comparison result obtaining means for obtaining a comparison result of a comparison between target user's user information of a predetermined item in one service and fraudulent user's or authentic user's user information of the predetermined item in another service, in which fraudulence is estimated based on user information of another item; and estimation means for estimating fraudulence of the target user based on the comparison result.

According to one embodiment of the present invention, there is provided a fraud estimation method including: a relevance information obtaining step of obtaining relevance information about relevance between one service and another service; a comparison result obtaining step of obtaining a comparison result of a comparison between user information of a target user in the one service and user information of a fraudulent user or an authentic user in the another service; and estimation means for estimating fraudulence of the target user based on the relevance information and the comparison result.

According to one embodiment of the present invention, there is provided a program for causing a computer to function as: relevance information obtaining means for obtaining relevance information about relevance between one service and another service; comparison result obtaining means for obtaining a comparison result of a comparison between user information of a target user in the one service and user information of a fraudulent user or an authentic user in the another service; and estimation means for estimating fraudulence of the target user based on the relevance information and the comparison result.

According to one aspect of the present invention, the relevance information obtaining means is configured to obtain a plurality of pieces of relevance information each corresponding to a plurality of other services, the comparison result obtaining means is configured to obtain a plurality of comparison results each corresponding to the plurality of other services, and the estimation means is configured to estimate fraudulence of the target user based on the plurality of pieces of relevance information and the plurality of comparison results.

According to one aspect of the present invention, in the one service, fraudulence is estimated based on user information of a predetermined item, and the comparison result obtaining means is configured to obtain a comparison result of a comparison between the target user's user information of the predetermined item in the one service and fraudulent user's or authentic user's user information of the predetermined item in the another service.

According to one aspect of the present invention, in the another service, fraudulence is estimated based on user information of a first item, and the comparison result obtaining means is configured to obtain a comparison result of a comparison between the target user's user information of a second item in the one service and fraudulent user's or authentic user's user information of the second item in the another service.

According to one aspect of the present invention, the relevance information obtaining means is configured to obtain relevance information about relevance between the first item and the second item in the another service, and the estimation means is configured to estimate fraudulence of the target user based on the relevance information about the relevance between the first item and the second item in the another service.

According to one aspect of the present invention, in the another service, fraudulence is estimated based on user information of each of a plurality of first items, the relevance information obtaining means is configured to obtain relevance information about relevance of each of the plurality of first items in the another service, and the estimation means is configured to estimate fraudulence of the target user based on the relevance information about the relevance of each of the plurality of first items in the another service.

According to one aspect of the present invention, the comparison result obtaining means is configured to obtain a comparison result of a comparison between the target user's user information of each of a plurality of items in the one service and fraudulent user's or authentic user's user information of each of the plurality of items in the another service, and the estimation means is configured to estimate fraudulence of the target user based on a plurality of comparison results each corresponding to the plurality of items.

According to one aspect of the present invention, the relevance information obtaining means is configured to obtain a plurality of pieces of relevance information each corresponding to the plurality of items, and the estimation means is configured to estimate fraudulence of the target user based on the plurality of pieces of relevance information.

According to one aspect of the present invention, in the another service, a comparison is made between user information of the target user in the one service and user information of a fraudulent user or an authentic user in the another service, and the comparison result obtaining means is configured to obtain a result of the comparison from the another service.

According to one aspect of the present invention, the fraud estimation system further includes setting means for setting the relevance information based on a comparison result of a comparison between user information of a fraudulent user or an authentic user in the one service and user information of a fraudulent user or an authentic user in the another service.

According to one aspect of the present invention, the fraud estimation system further includes registration receiving means for receiving user registration in the one service, the target user is a user who performs the user registration, and the estimation means is configured to estimate fraudulence of the target user when the user registration is received.

Advantageous Effects of Invention

According to the one embodiment of the present invention, estimation precision can be raised.

BRIEF DESCRIPTION OF DRAWINGS

FIG. 4 is a table for showing a data storage example of a user database of Service A.

FIG. 6 is a table for showing a data storage example of a user database of Service B.

FIG. 7 is a table for showing a data storage example of a blacklist of Service B.

FIG. 8 is a table for showing a data storage example of a user database of Service C.

FIG. 10 is a table for showing a data storage example of a relevance information database.

DESCRIPTION OF EMBODIMENTS

1. First Embodiment

An example of a fraud estimation system according to a first embodiment of the present invention (hereinafter referred to as "first embodiment") is described below.

[1-1. Overall Configuration of Fraud Estimation System]

Figure 1:
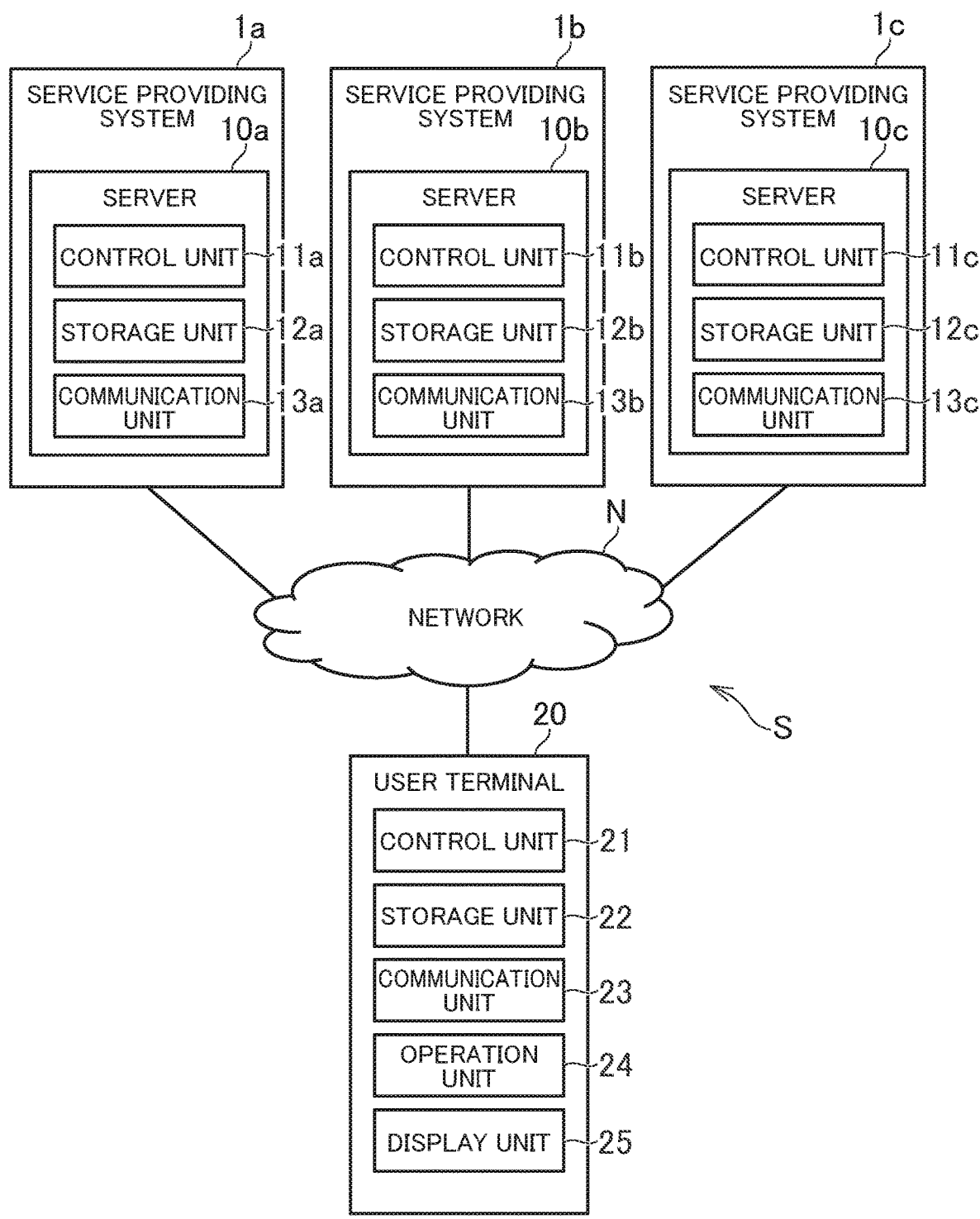
FIG. 1 is a diagram for illustrating an overall configuration of a fraud estimation system according to a first embodiment of the present invention.

FIG. 1 is a diagram for illustrating an overall configuration of the fraud estimation system according to the first embodiment. As illustrated in FIG. 1, a fraud estimation system S includes service providing systems 1a to 1c and a user terminal 20, which can be connected to the Internet or a similar network N.

The service providing systems 1a to 1c are each a system for providing a service to users. Each of the service providing systems 1a to 1c can provide a service of any type and provides users with, for example, an electronic settlement service, a financial service, an electronic transaction service, an insurance service, a communication service, a home delivery service, or a video streaming service. In this embodiment, services provided by the service providing systems 1a to 1c are referred to as "Service A" to "Service C", respectively.

The service providing systems 1a to 1c include, for example, servers 10a to 10c, respectively. In the following description, the service providing systems 1a to 1c are simply referred to as "service providing systems 1" when it is not particularly required to distinguish the service providing systems 1a to 1c from one another. Similarly, the servers 10a to 10c are simply referred to as "servers 10" when it is not particularly required to distinguish the servers 10a to 10c from one another. The same applies to control units 11a to 11c, storage units 12a to 12c, and communication units 13a to 13c illustrated in FIG. 1, and alphabets at the tail end of their reference symbols are omitted when it is not particularly required to distinguish one of the identical units from another.

The server 10 is a server computer. The server 10 includes a control unit 11, a storage unit 12, and a communication unit 13. The control unit 11 includes at least one processor. The control unit 11 executes processing in accordance with a program and data that are stored in the storage unit 12. The storage unit 12 includes a main memory and an auxiliary memory. For example, the main memory is a RAM or a similar volatile memory, and the auxiliary memory is a ROM, an EEPROM, a flash memory, a hard disk drive, or a similar non-volatile memory. The communication unit 13 is a communication interface for cable communication or wireless communication, and holds data communication over the network N.

The user terminal 20 is a computer to be operated by a user. For example, the user terminal 20 is a cellular phone (including a smart phone), a portable information terminal (including a tablet computer), or a personal computer. In this embodiment, the user terminal 20 includes a control unit 21, a storage unit 22, a communication unit 23, an operation unit 24, and a display unit 25. The control unit 21, the storage unit 22, and the communication unit 23 may have the same physical configurations as those of the control unit 11, the storage unit 12, and the communication unit 13, respectively.

The operation unit 24 is an input device, for example, a pointing device, which is a touch panel, a mouse, or the like, a keyboard, or a button. The operation unit 24 transmits what operation has been performed by the user to the control unit 21. The display unit 25 is, for example, a liquid crystal display unit or an organic EL display unit. The display unit 25 displays an image following an instruction of the control unit 21.

Programs and data described as ones to be stored in the storage units 12 and 22 may be supplied via the network N. The hardware configurations of the computers described above are not limited to the examples given above, and may employ various types of hardware. For instance, the computers may include a reading unit (for example, an optical disc drive or a memory card slot) configured to read a computer-readable information storage medium, and an input/output unit (for example, a USB port) for data input/output to/from an external device. For example, a program or data stored in an information storage medium may be supplied to the computers via the reading unit or the input/output unit.

There may be any number of service providing systems 1, and the number of service providing systems 1 is not limited to three. For instance, there may be two service providing systems 1 or four or more service providing systems 1. To give another example, one service providing system 1 may provide a plurality of services. It is sufficient for each service providing system 1 to include at least one computer, and may include, for example, a plurality of servers 10 or a computer that is nota server computer. Although only one user terminal 20 is illustrated in FIG. 1, there may also be a plurality of user terminals 20.

[1-2. Outline of Fraud Estimation System]

In this embodiment, the service providing systems 1 each manage a blacklist indicating fraudulent users.

A fraudulent user may mean a user who actually has committed fraudulence, or may mean a user who may possibly commit fraudulence in the future. For example, a user has taken an action that is in violation of the service's terms, a user who has committed an illegal act, or a user who has a possibility for those qualifies as a fraudulent user. A user who has, for example, committed unauthorized access, committed unauthorized use of a credit card, hijacked another person's account, hacked, cracked, posted a malicious post, intentionally flooded the service with access, or harassed another user also qualifies as a fraudulent user.

The blacklist is a list in which user information about fraudulent users is stored. In other words, the blacklist is data with which a fraudulent user can be identified. A fraudulent user on the blacklist is limited in the use of the service. For example, the cessation of the user ID (user account) itself or the disabling of some functions of the service qualifies as limiting the use of the service. When fraud is estimated, it is not required to immediately limit the use of the service: the use of the service may be limited after an administrator examines, or the use of the service may be limited after additional authentication is performed on the user.

The blacklist may be edited manually by an administrator of the service, or may be edited automatically through analysis performed by the service providing system 1 on a user's activity. Items of user information to be stored in the blacklist (hereinafter referred to as "blacklist items") may be common to all services. In this embodiment, blacklist items set down for a service are items adapted to the service.

Service A has, for example, the user ID as a blacklist item, and the user ID of a fraudulent user in Service A is stored in the blacklist of Service A. The service providing system 1*a* determines whether the user ID of a user who intends to use Service A is stored in the blacklist. The service providing system 1*a* limits the use of Service A by a user whose user ID is stored in the blacklist.

Service B has, for example, two blacklist items: the user ID and the device ID of the user terminal 20, and the user ID and device ID of a fraudulent user in Service B are stored in the blacklist of Service B. The service providing system 1*b* determines whether anyone of the user ID and device ID of a user who intends to use Service B is stored in the blacklist. The service providing system 1*b* limits the use of Service B by a user whose user ID or device ID is stored in the blacklist. The condition for limiting the use of Service B may be the storing of both of the user ID and the device ID in the blacklist, instead of the storing any of one of the user ID and the device ID.

Service C has, for example, a card number of a credit card as a blacklist item, and a card number of a fraudulent user in Service C is stored. The service providing system 1*c* determines whether a card number of a user who intends to use Service C is stored in the blacklist. The service providing system 1*c* limits the use of Service C by a user whose card number is stored in the blacklist.

As described above, each service providing system 1 limits the use of the service by a fraudulent user who is on the own system's blacklist. However, there are users who are not on the blacklist of the service providing system 1 but commit fraudulence, and the utilization of its own blacklist alone is therefore not always enough to prevent fraudulence of such users.

For instance, a fraudulent user in Service C cannot be prevented from committing fraudulence with the use of a card number different from a card number stored in the blacklist because the different card number is not on the blacklist of Service C. In this regard, the fraudulent user may have committed fraudulence in the other services, namely, Service A and Service B, and may have registered the different card number to the other services A and B. Fraudulence can therefore be prevented when there is a way to detect that a card number of a user using Service C matches a card number of a fraudulent user in the other services A and B.

The fraud estimation system S accordingly estimates whether a user of one service providing system 1 is a fraudulent user with the use of the blacklist of another service providing system 1. In this embodiment, processing of the fraud estimation system S is described taking as an example a case in which fraudulence of a user who attempts user registration to Service C is estimated with the use of the blacklists of Service A and Service B.

Figure 2:
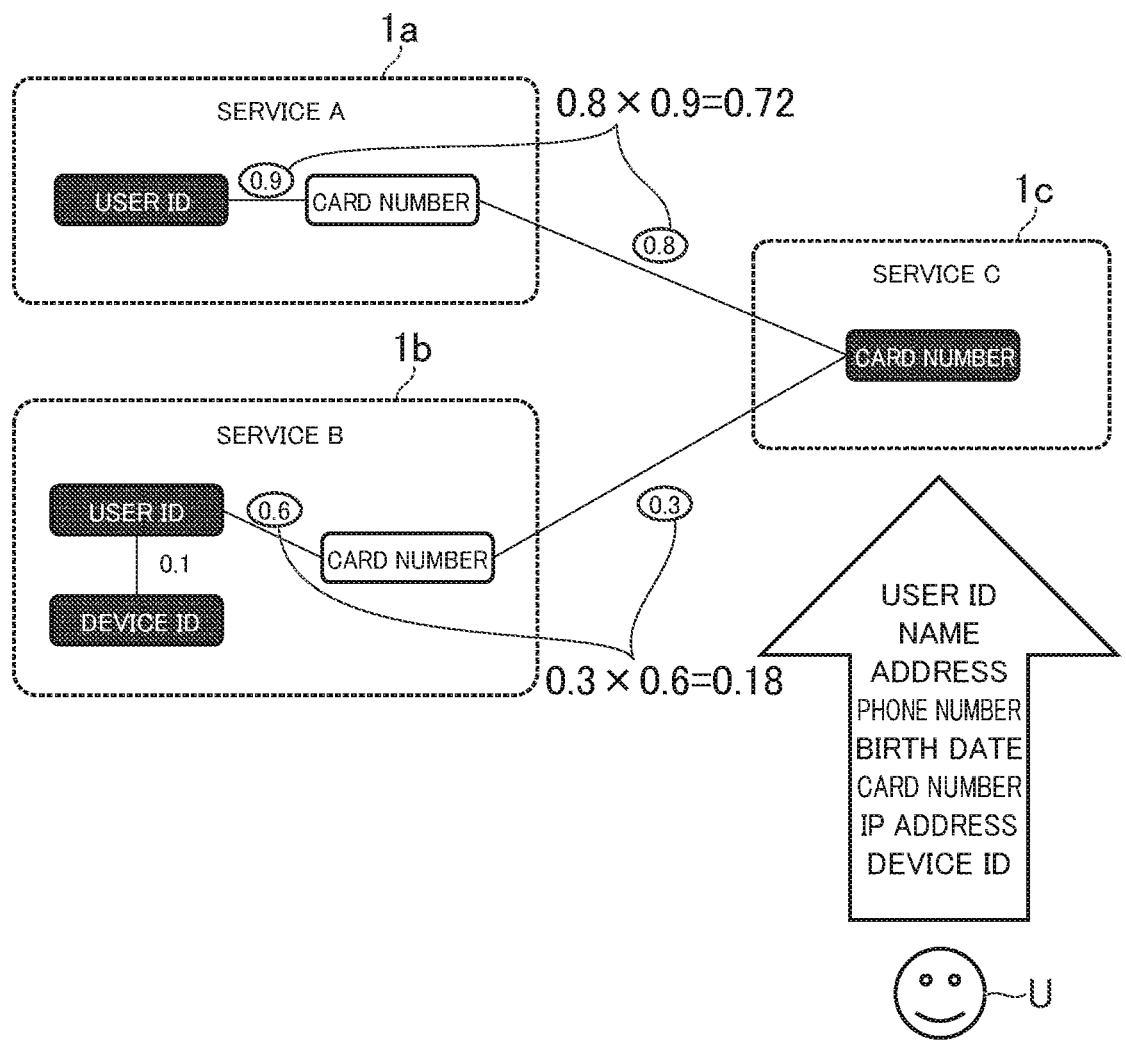
FIG. 2 is an explanatory diagram for outlining processing of the fraud estimation system.

FIG. 2 is an explanatory diagram for outlining processing of the fraud estimation system S. An item hatched in FIG. 2 is a blacklist item. As described above, the blacklist item of Service A is the user ID, the blacklist items of Service B are the user ID and the device ID, and the blacklist item of Service C is the card number.

As illustrated in FIG. 2, a user U who starts using Service C inputs user information having a plurality of items, for example, a user ID, a name, an address, a phone number, a birth date, a card number, and an IP address and device ID of the user terminal 20. Although a case in which the user U inputs his or her user ID himself or herself is described in this embodiment, the user ID may automatically be assigned by the service providing system 1c.

The service providing system 1c requests the service providing systems 1a and 1b to compare the card number input by the user U and card numbers of fraudulent users on the blacklists of Service A and Service B. That is, the service providing system 1c requests the service providing systems 1a and 1b to determine whether a fraudulent user in Service A or Service B has registered the card number of the user U.

The service providing system 1a refers to card numbers registered to Service A by fraudulent users on the blacklist of the service providing system 1a to compare the card numbers to the card number received from the service providing system 1c. Similarly, the service providing system 1b refers to card numbers registered to Service B by fraudulent users on the blacklist of the service providing system 1b to compare the card numbers to the card number received from the service providing system 1c.

The service providing systems 1a and 1b each transmit the result of the comparison (whether there is a matching card number) to the service providing system 1c. The service providing system 1c permits the user registration when none of the card numbers of the fraudulent users in Service A and Service B matches the card number of the credit card owned by the user U, and the probability of the user U having committed no fraudulence in the other services, namely, Service A and Service B, is accordingly high.

When one of the card numbers of the fraudulent users in Service A and Service B matches the card number of the credit card owned by the user U, on the other hand, the user U is the same user as the fraudulent user in another service, namely, Service A or Service B, and is highly probable to commit fraudulence in Service C as well. The service providing system 1c therefore restricts the user registration.

In this regard, one of Service A and Service B may be a service low in relevance to Service C. When the blacklist of a service low in relevance and the blacklist of a service high in relevance are handled equally in the estimation of fraudulence of the user U in Service C, there is a possibility that the precision of fraud estimation cannot be raised to a satisfactorily high level. For instance, when the comparison result of Service B is used as it is for a user who is a fraudulent user in Service B but does not use the same card number to commit fraudulence in Service C, user registration in Service C may excessively be restricted.

To address this, the service providing system 1c calculates the degree of fraudulence of the user U who attempts user registration to Service C, based on relevance information about the relevance of Service A and Service B to Service C.

Relevance information is information indicating the level of relevance among a plurality of services. Relevance is the level of probability at which a user who has committed fraudulence in one service commits fraudulence in the other service. In other words, relevance is the level of ratio at which a fraudulent user in one service and a fraudulent user in the other service share a feature. In this embodiment, a case in which the relevance information is a numerical value (weight coefficient) is described. The level of relevance, however, may be expressed by an index other than the numerical value, for example, a sign. A higher numerical value indicated by the relevance information means a higher level of relevance.

The degree of fraudulence is the probability of the user U being a fraudulent user. A higher degree of fraudulence indicates a higher level of probability at which the user U commits fraudulence in Service C. In this embodiment, the degree of fraudulence increases when the card number is a match and the relevance is higher. In the case of fraud estimation using an item other than the card number (for example, the name or the address), the degree of fraudulence increases when the other item is a match and the relevance is higher. The degree of fraudulence, which is a numerical number in the case described in this embodiment, may be expressed by an index other than the numerical value, for example, a sign.

In the example of FIG. 2, the relevance between the card number of Service A and the card number of Service C is relatively high, and the relevance information is 0.8. For example, a ratio at which a card number used by a fraudulent user in Service A is used as a fraudulent card number in Service C as well is calculated and, when the calculated ratio is approximately 8/10, the relevance information for the card number of Service A and the card number of Service C is set to 0.8.

The relevance between the card number of Service B and the card number of Service C, on the other hand, is relatively low, and the relevance information is 0.3. For example, a ratio at which a card number used by a fraudulent user in Service B is used as a fraudulent card number in Service C as well is calculated and, when the calculated ratio is approximately 3/10, the relevance information for the card number of Service A and the card number of Service C is set to 0.3.

In this embodiment, relevance information is set also between the user ID, which is a blacklist item of Service A, and the card number of Service A. In the example of FIG. 2, the probability at which the user ID of a fraudulent user in Service A and a card number of the fraudulent user are relevant to each other is relatively high, and the relevance information about the relevance between the user ID and the card number is 0.9. In the example of FIG. 2, in which the relevance information about the relevance between the card number as a blacklist item of Service C and the card number of Service A is 0.8, and the relevance information about the relevance between the user ID as a blacklist item of Service A and the card number of Service A is 0.9, the relevance information about the relevance between Service A and Service C is obtained as 0.72 by multiplying the two.

On the other hand, the probability at which the user ID of a fraudulent user in Service B and a card number of the fraudulent user are relevant to each other is middle, and the relevance information about the relevance between the user ID of Service B and the card number of Service B is 0.6. In the example of FIG. 2, in which the relevance information about the relevance between the card number as a blacklist item of Service C and the card number of Service B is 0.3, and the relevance information about the relevance between the user ID as a blacklist item of Service B and the card number of Service B is 0.6, the relevance information about the relevance between Service A and Service B is obtained as 0.18 by multiplying the two. In this embodiment, the relevance information is set between the blacklist items as well. Specifically, the relevance between the user ID and the device ID, which are blacklist items of Service B, is low, and the relevance information is 0.1.

For example, when a card number of a fraudulent user whose user ID is on the blacklist of Service A matches the card number of the user U, and a card number of a fraudulent user whose user ID is on the blacklist of Service B matches the card number of the user U, the degree of fraudulence is calculated by "0.8*0.9+0.3*0.6" as "0.9".

To give another example, when a card number of a fraudulent user whose user ID is on the blacklist of Service A matches the card number of the user U, but the card numbers of the fraudulent users whose user IDs or device IDs are on the blacklist of Service B do not match the card number of the user U, the degree of fraudulence is calculated by "0.8*0.9" as "0.72".

To give another example, when a card number of a fraudulent user whose user ID is on the blacklist of Service A does not match the card number of the user U, and a card number of a fraudulent user whose user ID is on the blacklist of Service B matches the card number of the user U, the degree of fraudulence is calculated by "0.3*0.6" as "0.18".

To give another example, when a card number of a fraudulent user whose user ID is on the blacklist of Service B does not match the card number of the user U, but a card number of a fraudulent user whose device ID is on the blacklist of Service B matches the card number of the user U, the degree of fraudulence is calculated by "0.3*0.6*0.1" as "0.018".

The service providing system 1c determines whether the calculated degree of fraudulence is equal to or higher than a threshold value (for example, 0.7). When the degree of fraudulence is lower than the threshold value, the service providing system 1c estimates that the user U is not fraudulent in Service C, and permits the user registration to Service C. When the degree of fraudulence is equal to or higher than the threshold value, on the other hand, the service providing system 1c estimates that the user U is fraudulent in Service C, and restricts the user registration to Service C.

The fraud estimation system S of this embodiment thus raises the precision of fraud estimation without rendering user registration excessively strict, by user fraud estimation that takes the relevance information into account as well as the results of the comparison of a card number of a user who attempts user registration to Service C to card numbers of fraudulent users in each of Service A and Service B. Details of this technology are described below. In the following description, the reference symbol of the user U who attempts user registration to Service C is omitted.

[1-3. Functions Implemented in Fraud Estimation System]

Figure 3:
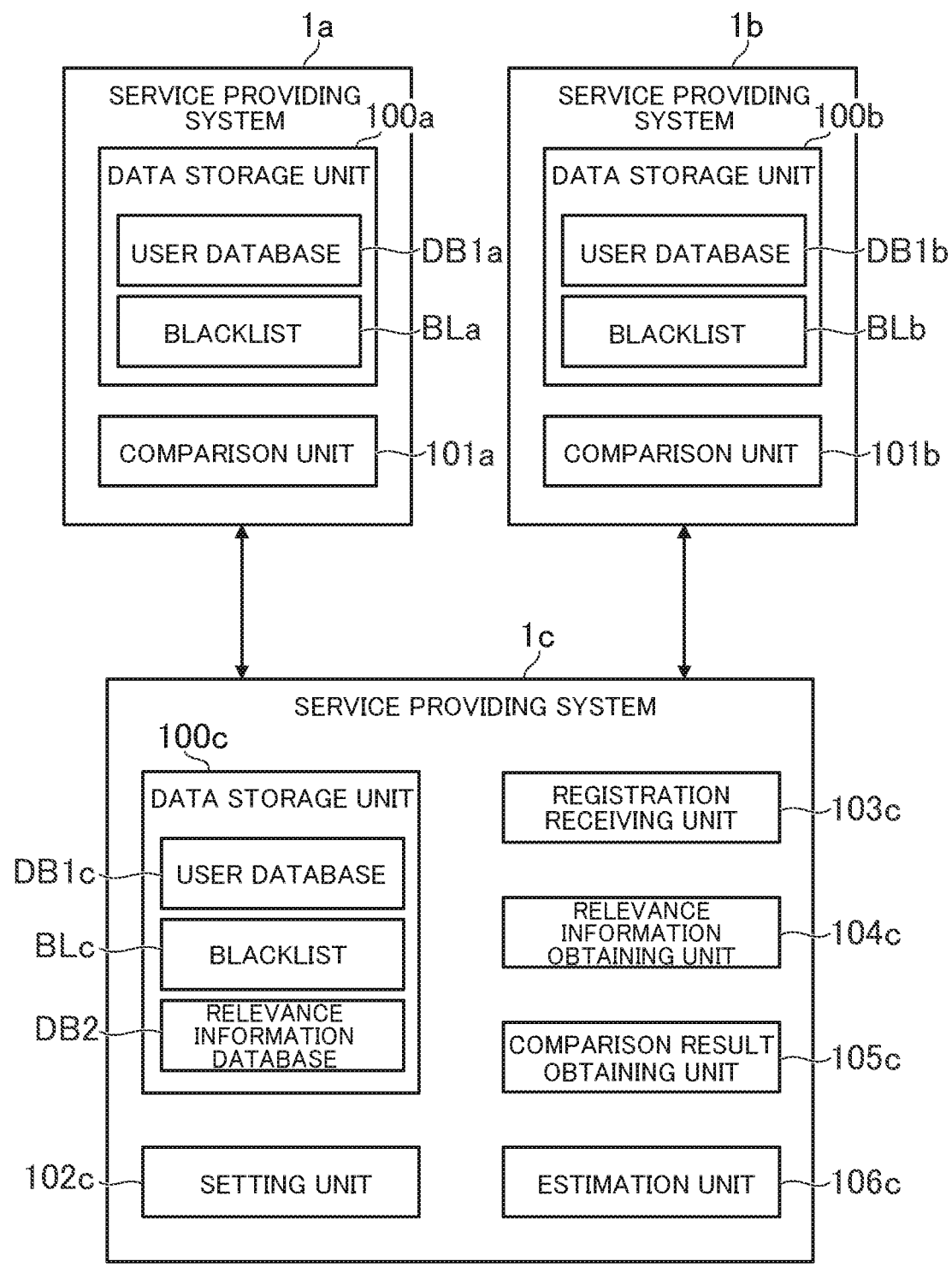
FIG. 3 is a function block diagram for illustrating an example of functions implemented in the fraud estimation system.

FIG. 3 is a function block diagram for illustrating an example of functions implemented in the fraud estimation system S. In this embodiment, a case in which functions implemented by the service providing systems 1a and 1b differ from functions implemented by the service providing system 1c is described. However, the service providing systems 1a to 1c may each have the same functions as in a modification example of the one embodiment of the present invention described later.

[1-3-1. Functions Implemented in Service A]

As illustrated in FIG. 3, a data storage unit 100a and a comparison unit 101a are implemented by the service providing system 1a of Service A.

[Data Storage Unit]

The data storage unit 100a is implemented mainly by the storage unit 12a. The data storage unit 100a stores data that is required to execute processing described in this embodiment. As an example of the data to be stored in the data storage unit 100a, a user database DB1a of Service A, and a blacklist BLa of Service A are described here.

FIG. 4 is a table for showing a data storage example of the user database DB1a of Service A. As shown in FIG. 4, the user database DB1a is a database storing user information of a user who has executed user registration to Service A. The user database DB1a stores, for example, a user ID with which a user is uniquely identified, and registration information registered by the user at the time of user registration. The registration information is user information other than the user ID, for example, the user's personal information.

The user database DB1a stores a piece of user information for each of a plurality of items. An item is the type or content of user information. As shown in FIG. 4, the user database DB1a in this embodiment stores eight items of user information, including the user ID, the name, the address, the phone number, the birth date, the credit card number of a credit card, an IP address of the user terminal 20, and the device ID of the user terminal 20.

The user information to be stored in the user database DB1a is not limited to the example of FIG. 4. It is sufficient for the user database DB1a to store user information of any items, for example, user information of items including the place of work, the post, the age, the gender, a nickname, a face photo, SIM information of the user terminal 20, a password, biometric information or other types of authentication information, an email address, access location information, and access date.

Figure 5:
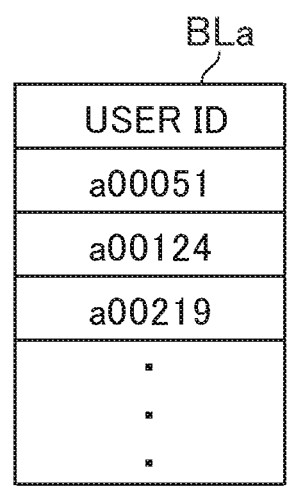
FIG. 5 is a table for showing a data storage example of a blacklist of Service A.

FIG. 5 is a table for showing a data storage example of a blacklist BLa of Service A. In this embodiment, the user ID is the blacklist item of Service A, and the user ID of a fraudulent user in Service A is accordingly stored in the blacklist BLa of Service A. For example, an administrator of Service A operates his or her own terminal to register the user ID of the fraudulent user to the blacklist BLa.

To give another example, the service providing system 1a analyzes activities of users, estimates a user who matches a criterion of a predetermined rule as a fraudulent user, and registers the user ID of this user to the blacklist BLa. The rule may be any rule, for example, a rule about the settlement amount, the settlement frequency, access location, or access time. As still another example, the service providing system 1a may use a machine learning model that detects fraudulence of a user to detect a fraudulent user, and register the user ID of the detected fraudulent user to the blacklist BLa.

The blacklist BLa may store user information of an item other than the blacklist item. For instance, user information of an item other than the user ID of a fraudulent user (for example, the name or the address) may be obtained from the user database DB1a to be stored in the blacklist BLa along with the user ID, which is the blacklist item.

[Comparison Unit]

The comparison unit 101a is implemented mainly by the control unit 11a. The comparison unit 101a compares user information of a target user in one service and user information of fraudulent users in another service.

"One service" is a service used by the target user. "Target user" is a user who is a target of fraud estimation. In other words, a target user is a user to be processed by processing of the estimation unit 106c described later. "Another service" is a service other than the one service. The same person as a user of "one service" may have performed user registration to "another service".

In this embodiment, a case of estimating a user's fraudulence in Service C is described, and Service C accordingly corresponds to "one service" while each of Service A and Service B corresponds to "another service". In the description of this embodiment, Service C can therefore be read as "one service", and Service A or Service B can be read as "another service". A user who attempts user registration in Service C can be read as "target user".

The comparison unit 101a compares user information of the target user in Service C and user information of fraudulent users in Service A. The fraudulent users in Service A are users on the blacklist BLa of Service A. Specifically, a fraudulent user in Service A is a user whose user ID is stored in the blacklist BLa of Service A.

In this embodiment, a case of comparing the card number, which is the blacklist item of Service C, is described, but user information of any item may be compared. For instance, user information of an item other than the blacklist item of Service C may be compared, or user information of a plurality of items including the blacklist item of Service C and other items may be compared.

For example, the comparison unit 101a obtains a card number of the target user from the service providing system 1c of Service C. The comparison unit 101a obtains card numbers of fraudulent users in Service A (namely, card numbers associated with user IDs that are stored in the blacklist BLa) based on the user database DB1a and the blacklist BLa.

The comparison unit 101a compares the card number of the target user in Service C and the card numbers of the fraudulent users in Service A. The comparison unit 101a transmits the result of the comparison to the service providing system 1c of Service C. The comparison result may have any data format, and takes one of a value indicating that the card number is a match and a value indicating that the card number is not a match.

In this embodiment, the card number is compared, and a case in which the comparison unit 101a determines whether the card number is a complete match (identical) is accordingly described. When another type of user information, for example, the address or the email address, is compared, however, the comparison unit 101a may determine whether the user information is a partial match (similar). That is, whether the target user of Service C is the same person as a fraudulent user in Service A may be estimated by a partial match instead of a complete match. The partial match to be determined may be any one of forward match, middle match, and backward match.

In this embodiment, the blacklist BLa of Service A stores only the user ID, which is the blacklist item, and the comparison unit 101a accordingly obtains a card number of a fraudulent user by referring to the user database DB1a. When the blacklist BLa also stores a card number in association with the user ID of a fraudulent user, the comparison unit 101a may obtain a card number of a fraudulent user by referring to the blacklist BLa.

[1-3-2. Functions Implemented in Service B]

As illustrated in FIG. 3, a data storage unit 100b and a comparison unit 101b are implemented by the service providing system 1b.

[Data Storage Unit]

The data storage unit 100b is implemented mainly by the storage unit 12b. The data storage unit 100b stores data that is required to execute processing described in this embodiment. As an example of the data stored in the data storage unit 100b, a user database DB1b of Service B and a blacklist BLb of Service B are described here.

FIG. 6 is a table for showing a data storage example of the user database DB1b of Service B. As shown in FIG. 6, the user database DB1b of Service B is a database storing user information of a user who has executed user registration to Service B. In this embodiment, a case in which items stored in the user database DB1a of Service A and items stored in the user database DB1b of Service B are the same is described. Details of the item stored in the user database DB1b of Service B are the same as those of the user database DB1a of Service A, and a description on the details is therefore omitted.

In this embodiment, a unique user ID is issued to each service. One same person therefore has different user IDs in Service A and Service B. One same person who uses a plurality of credit cards may also have different card numbers in Service A and Service B. The same applies to other items, and user information of one same person may differ in Service A and Service B.

The user database DB1a of Service A and the user database DB1b of Service B may store items different from each other. For instance, the user database DB1a of Service A may store the address whereas the user database DB1b of Service B does not store the address. The same applies to Service C and, although a case in which a user database DB1c of Service C store items that are the same as the items stored in the user database DB1a of Service A and the user database DB1b of Service B is described in this embodiment, the user database DB1c may store items different from those of the user databases DB1a and DB1b. In each service, it is sufficient to register user information of items required for user registration to the service.

FIG. 7 is a table for showing a data storage example of the blacklist BLb of Service B. As shown in FIG. 7, two items, namely, the user ID and the device ID, are the blacklist items of Service B in this embodiment, and the blacklist BLb of Service B accordingly stores the user ID and device ID of a fraudulent user in Service B.

The blacklist BLb of Service B differs from the blacklist BLa of Service A in blacklist item, and is the same as the blacklist BLa in the rest. Descriptions on the same points are therefore omitted. The omitted description can be found by reading "Service A", "service providing system 1a", "user ID", and "blacklist BLa" in the description of the blacklist BLa of Service A as "Service B", "service providing system 1b", "user ID and device ID", and "blacklist BLb", respectively.

[Comparison Unit]

The comparison unit 101b is implemented mainly by the control unit 11b. The comparison unit 101b compares user information of a target user in Service C and user information of fraudulent users in Service B. Processing of the comparison unit 101b is the same as the processing of the comparison unit 101a, and a description thereof is therefore omitted. The omitted description can be found by reading "Service A", "user ID", "user database DB1a", and "blacklist BLa" in the description of the comparison unit 101a as "Service B", "user ID and device ID", "user database DB1b", and "blacklist BLb", respectively.

[1-3-3. Functions Implemented in Service C]

As illustrated in FIG. 3, a data storage unit 100c, a setting unit 102c, a registration receiving unit 103c, a relevance information obtaining unit 104c, a comparison result obtaining unit 105c, and an estimation unit 106c are implemented by the service providing system 1c.

[Data Storage Unit]

The data storage unit 100c is implemented mainly by the storage unit 12c. The data storage unit 100c stores data that is required to execute processing described in this embodiment. As an example of the data stored in the data storage unit 100c, a user database DB1c of Service C, a blacklist BLc of Service C, a relevance information database DB2 are described here.

FIG. 8 is a table for showing a data storage example of the user database DB1c of Service C. As shown in FIG. 8, the user database DB1c of Service C is a database storing user information of a user who has executed user registration to Service C. In this embodiment, details of each item stored in the user database DB1c of Service C are the same as those of the user database DB1a of Service A and the user database DB1b of Service B, and a description on the details is therefore omitted.

Figure 9:
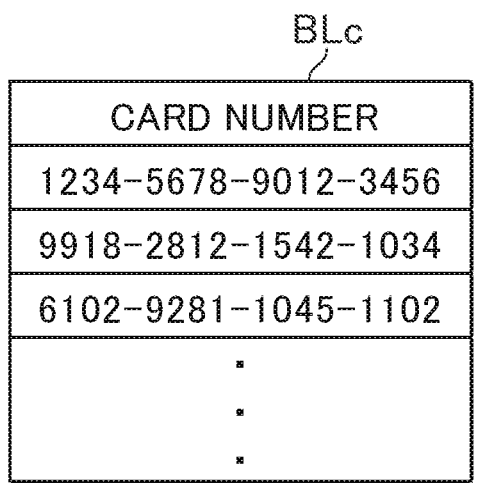
FIG. 9 is a table for showing a data storage example of a blacklist of Service C.

FIG. 9 is a table for showing a data storage example of the blacklist BLc of Service C. As shown in FIG. 9, the card number is the blacklist items of Service C in this embodiment, and the blacklist BLc of Service C accordingly stores the card number of a fraudulent user in Service C.

The blacklist BLc of Service C differs from the blacklist BLc of Service A in blacklist item, and is the same as the blacklist BLc in the rest. Descriptions on the same points are therefore omitted. The omitted description can be found by reading "Service A", "service providing system 1a", "user ID", and "blacklist BLa" in the description of the blacklist BLa of Service A as "Service C", "service providing system 1c", "card number", and "blacklist BLc", respectively.

FIG. 10 is a table for showing a data storage example of the relevance information database DB2. As shown in FIG. 10, the relevance information database DB2 is a database storing relevance information. In this embodiment, there are two types of relevance information; one is relevance information that indicates relevance between an item of one service and the item of another service, and the other is relevance information that indicates relevance between a plurality of items in one service. The two types of relevance information are stored in the relevance information database DB2. As described with reference to FIG. 2, the two types of relevance information are prepared in this embodiment, and relevance between services is expressed with a value obtained by the multiplication of the two types of relevance information.

In the data storage example of FIG. 10, the relevance information described with reference to FIG. 2 is stored in the relevance information database DB2. For example, as the relevance information that indicates relevance between an item of one service and the item of another service, "0.8", which is relevance information about relevance between the card number of Service A and the card number of Service C, and "0.3", which is relevance information about relevance between the card number of Service B and the card number of Service C, are stored. Although relevance between services with regards to the card number is discussed in this embodiment, relevance information common to a plurality of items may be prepared irrespective of specific user information.

To give another example, as the relevance information that indicates relevance between a plurality of items in one service, "0.9", which is relevance information about relevance between the user ID of Service A and the card number of Service A, "0.1", which is relevance information about relevance between the user ID of Service B and the device ID of Service B, and "0.6", which is relevance information about relevance between the user ID of Service B and the card number of Service B, are stored.

In this embodiment, a case in which the setting unit 102c described later sets the relevance information is described. The relevance information, however, may be set manually by an administrator of Service C.

[Setting Unit]

The setting unit 102c is implemented mainly by the control unit 11c. The setting unit 102c sets the relevance information based on the result of the comparison between user information of fraudulent users in Service C and user information of fraudulent users in Service A and Service B. The setting unit 102c may set the relevance information based on the result of the comparison on user information of any item, and may use the result of the comparison on user information of a plurality of items, or the result of the comparison on user information of a single item.

For example, the setting unit 102c sets the relevance information based on the result of comparing card numbers of fraudulent users in Service C to card numbers of fraudulent users in the other services, namely, Service A and Service B. The setting unit 102c transmits every card number stored in the blacklist BLc of Service C (namely, card numbers of fraudulent users in Service C) to the service providing system 1a of Service A, and requests the comparison to card numbers of fraudulent users in Service A. The setting unit 102c may transmit only some of card numbers stored in the blacklist BLc of Service C.

The service providing system 1a receives the card numbers of the fraudulent users in Service C, and refers to the user database DB1a of Service A to obtain card numbers that are associated with user IDs stored in the blacklist BLa of Service A (card numbers of fraudulent users in Service A). The service providing system 1a compares the card numbers of the fraudulent users in Service C and the card numbers of the fraudulent users in Service A. The service providing system 1a adds up the number of matches between the former and the latter (hereinafter referred to as "aggregated count"), and transmits the aggregated count to the service providing system 1c.

The setting unit 102c sets the relevance information about relevance between the card number of Service A and the card number of Service C, based on the aggregated count received from the service providing system 1a. A calculation expression indicating a relationship between the aggregated count and the numerical value of the relevance information is stored in advance in the data storage unit. The calculation expression is determined so that a numerical value indicated by the relevance information is larger when the aggregated count is higher. The setting unit 102c substitutes the aggregated count in the calculation expression to calculate the numerical value of the relevance information, and stores the numerical value in the relevance information database DB2.

The description given above is about the case of executing the card number comparison processing in the service providing system 1a of Service A. The card number comparison processing, however, may be executed in the service providing system 1c. In this case, the service providing system 1c obtains card numbers of fraudulent users in Service A from the service providing system 1a to execute the card number comparison processing.

Processing of setting the relevance information about relevance between the card number of Service A and the card number of Service B is the same as the processing of setting the relevance information about relevance between the card number of Service A and the card number of Service C, and a description thereof is therefore omitted. The omitted description can be found by reading "Service A", "service providing system 1a", "user ID", and "blacklist BLa" in the description given above as "Service B", "service providing system 1b", "user ID and device ID", and "blacklist BLb", respectively.

In this embodiment, the setting unit 102c also sets the relevance information about relevance between a plurality of items in one service. For example, the setting unit 102c stores a numerical value specified by the administrator of Service A in the relevance information database DB2 as the value of the relevance information about relevance between the user ID and the card number in Service A. To give another example, the setting unit 102c stores a numerical value specified by an administrator of Service B in the relevance information database DB2 as the relevance information about relevance between the user ID and the card number in Service B. Instill another example, the setting unit 102c sets the value of the relevance information about relevance between the user ID and the device ID in Service B, based on a ratio at which a card number of a user whose user ID is stored in the blacklist BLb and a card number of a user whose device ID is stored in the blacklist BLb match in Service B.

[Registration Receiving Unit]

The registration receiving unit 103c is implemented mainly by the control unit 11c. The registration receiving unit 103c receives user registration in Service C. User registration is to register user information to Service C in order to start using Service C. User registration is sometimes called use registration or service registration. The registration receiving unit 103c receives user registration by, for example, receiving user information that is input from the user terminal 20 by a user with the use of the operation unit 24.

[Relevance Information Obtaining Unit]

The relevance information obtaining unit 104c is implemented mainly by the control unit 11c. The relevance information obtaining unit 104c obtains the relevance information about the relevance of Service A and Service B to Service C. In this embodiment, the relevance information is stored in the relevance information database DB2, and the relevance information obtaining unit 104c accordingly refers to the relevance information database DB2 stored in the data storage unit 100c to obtain the relevance information.

In this embodiment, each of Service A and Service B corresponds to "another service", which means that there are a plurality of other services, and the relevance information obtaining unit 104c accordingly obtains a plurality of pieces of relevance information each corresponding to the plurality of other services. That is, the relevance information obtaining unit 104c obtains, for each of the other services, the relevance information about relevance between one service and the other service.

In this embodiment, the card number, which is the blacklist item of Service C, is an item to be compared and, because the card number is not a blacklist item of Service A and Service B, the relevance information obtaining unit 104c obtains the relevance information about the relevance of blacklist items in Service A and Service B to the card number, which is nota blacklist item in Service A and Service B.

The blacklist items in Service A and Service B are an example of a first item in the one embodiment of the present invention. The first item is any item that is used for fraud estimation in Service A and Service B, which are each "another service". The user ID as the blacklist item of Service A, or the user ID or the device ID as one of the blacklist items of Service B in the description of this embodiment can therefore be read as the first item.

The card number is an example of a second item in the one embodiment of the present invention. The second item is an item of user information compared in fraud estimation. In this embodiment, the card number, which is the blacklist item of Service C, is compared, and the card number in the description can therefore be read as the second item. The relevance information obtaining unit 104c obtains the relevance information about relevance between the user ID and the card number in Service A, and the relevance information about relevance between the user ID and the card number in Service B.

In Service B, which is "another service", fraud is estimated based on pieces of user information of a plurality of first items. The relevance information obtaining unit 104c may accordingly obtain the relevance information about the relevance of each of a plurality of first items in "another service". In this embodiment, the user ID and the device ID are the blacklist items, and the relevance information thereof is prepared. The relevance information obtaining unit 104c accordingly obtains the relevance information about relevance between the plurality of blacklist items.

[Comparison Result Obtaining Unit]

The comparison result obtaining unit 105c is implemented mainly by the control unit 11c. The comparison result obtaining unit 105c obtains the result of the comparison of user information of a target user in Service C to user information of fraudulent users in Service A and Service B. In this embodiment, each of Service A and Service B corresponds to "another service", which means that there are a plurality of other services, and the comparison result obtaining unit 105c accordingly obtains a plurality of comparison results each corresponding to the plurality of other services.

In Service C, fraud is estimated based on the card number, and the comparison result obtaining unit 105c accordingly obtains the results of the comparison on a card number of a target user in Service C to card numbers of fraudulent users in the other services. The card number corresponds to the user information of a predetermined item in the one embodiment of the present invention. The predetermined item is any item that is used for fraud estimation in Service C, which is "one service". The card number, which is the blacklist item of Service C, in the description of this embodiment can therefore be read as the predetermined item.

As described above, the card number corresponds to the second item, and the comparison result obtaining unit 105c accordingly obtains the results of the comparison on target user's user information of the second item in Service C to fraudulent users' user information of the second item in Service A and Service B.

In this embodiment, instead of executing comparison processing in Service C, Service A and Service B handle the comparison of a card number of a target user in Service C to card numbers of fraudulent users in Service A and Service B. The comparison result obtaining unit 105c therefore obtains the results of the comparison from Service A and Service B. That is, the card numbers of Service A and Service B are not transmitted over the network N when the comparison result obtaining unit 105c obtains the comparison results. The comparison result obtaining unit 105c obtains the comparison result associated with Service A and the comparison result associated with Service B separately for Service A and Service B.

[Estimation Unit]

The estimation unit 106c is implemented mainly by the control unit 11c. The estimation unit 106c estimates fraudulence of a target user based on the relevance information obtained by the relevance information obtaining unit 104c and the comparison results obtained by the comparison result obtaining unit 105c. The estimation is to determine whether a target user is a fraudulent user. The result of the estimation by the estimation unit 106c may be the final result of determination about whether the target user is a fraudulent user, or the administrator may determine after the estimation result is provided.

For example, the estimation unit 106c calculates the degree of fraudulence based on the relevance information and the comparison results, and determines whether the degree of fraudulence is equal to or higher than a threshold value. The estimation unit 106c estimates that the target user is fraudulent when the degree of fraudulence is equal to or higher than the threshold value, and estimates that the target user is sound when the degree of fraudulence is lower than the threshold value.

A calculation expression of the degree of fraudulence is stored in advance in the data storage unit. This calculation expression is determined so that the degree of fraudulence is higher when the comparison results indicate a match in card number and a numerical value indicated by the relevance information is larger. The estimation unit 106c substitutes the relevance information and the comparison results in the calculation expression to calculate the degree of fraudulence. The degree of fraudulence calculated in a case that is described in this embodiment is the sum of values obtained by the multiplication of a plurality of pieces of relevance information as described above. However, a suitable calculation expression may be set by the administrator of Service C or by other measures.

In this embodiment, each of Service A and Service B corresponds to "another service", which means that there are a plurality of other services, and the estimation unit 106c accordingly estimates fraudulence of a target user based on a plurality of pieces of relevance information and a plurality of comparison results. For example, the estimation unit 106c substitutes a plurality of pieces of relevance information and a plurality of comparison results in the calculation expression to calculate the degree of fraudulence.

Further, in this embodiment, fraudulence in user registration is estimated, and a target user is therefore a user who attempts user registration. The estimation unit 106c estimates fraudulence of the target user when user registration is received. For example, the estimation unit 106c estimates fraudulence of the target user before user registration is completed. The estimation unit 106c may estimate fraudulence of the target user after user registration is completed.

The estimation unit 106c bases the estimation of the target user's fraudulence on the relevance information about relevance between items in Service A, which is "another service" and between items in Service B, which is "another service", because, in this embodiment, the relevance information is defined also between items in the other Service A and between items in the other Service B. That is, the estimation unit 106c estimates fraudulence of the target user based not only on the relevance information about relevance between an item of Service C and items of Service A and Service B but also on the relevance information about relevance between items in each of Service A and Service B.

The method of estimation by the estimation unit 106c is not limited to the method utilizing the degree of fraudulence, and any method may be used. For example, the estimation unit 106c may estimate fraudulence by determining whether a predetermined rule about comparison results and the relevance information is fulfilled, based on the relevance information obtained by the relevance information obtaining unit 104c and the comparison results obtained by the comparison result obtaining unit 105c. In another example, the estimation unit 106c may estimate fraudulence by utilizing a machine learning model for fraud estimation in which the relevance information obtained by the relevance information obtaining unit 104c and the comparison results obtained by the comparison result obtaining unit 105c are translated into feature amounts.

[1-4. Processing Executed in Fraud Estimation System]

Figure 11:
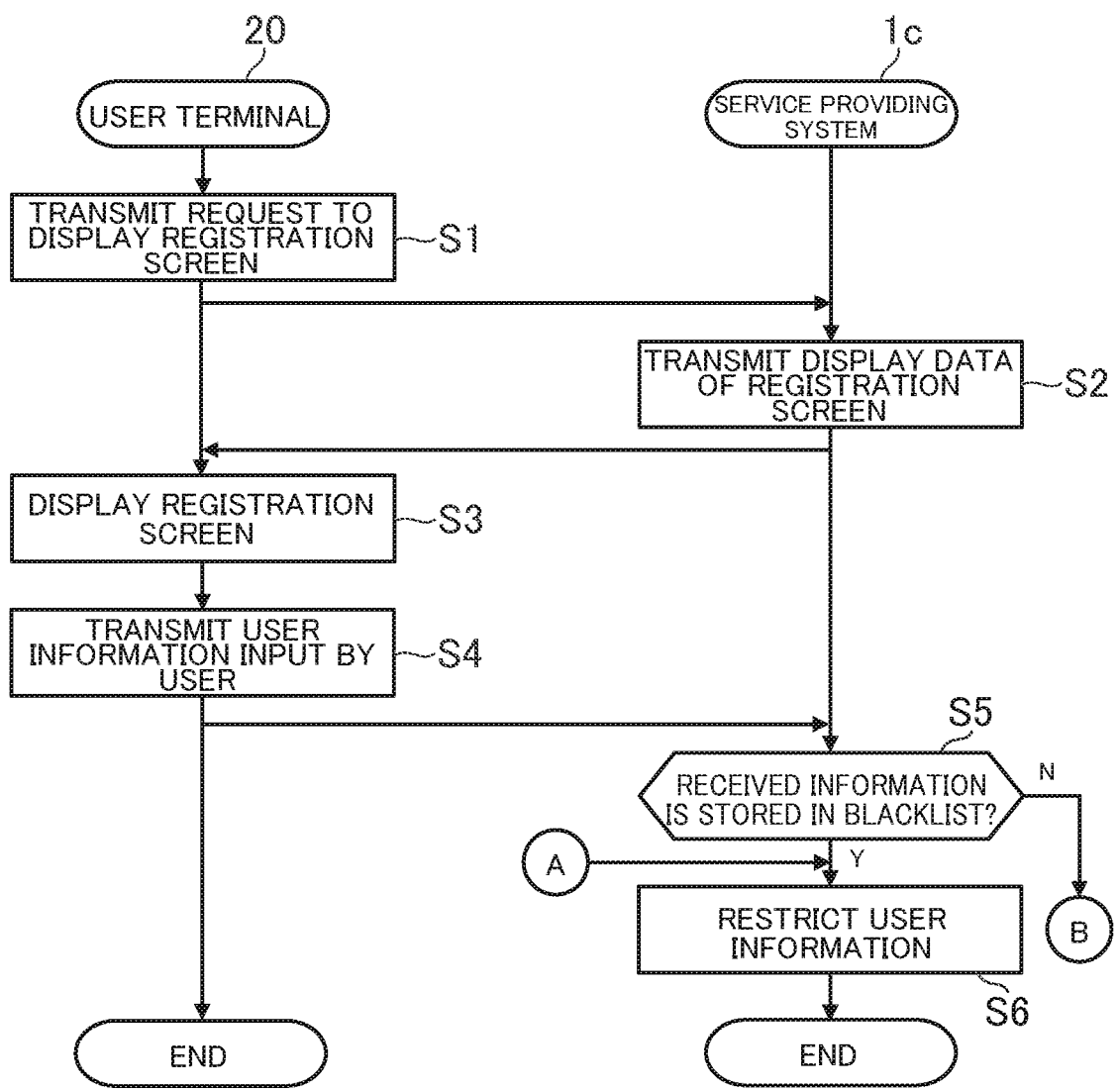
FIG. 11 is a flow chart for illustrating an example of processing executed in the fraud estimation system.
Figure 12:
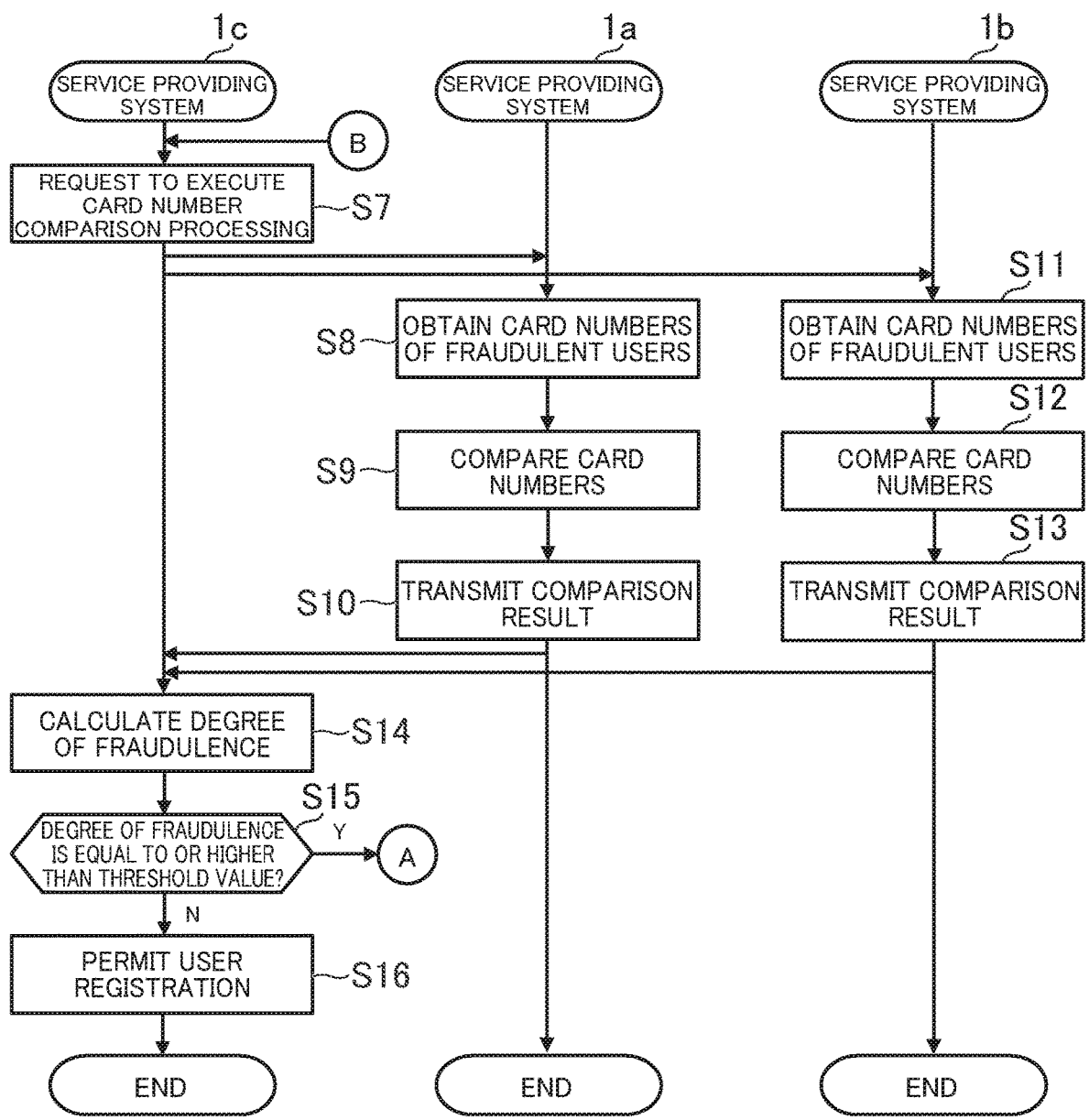
FIG. 12 is a flow chart for illustrating the example of the processing executed in the fraud estimation system.

FIG. 11 and FIG. 12 are flow charts for illustrating an example of processing executed in the fraud estimation system S. The processing illustrated in FIG. 11 and FIG. 12 is executed by the control units 11 and 2l by operating as programmed by programs that are stored in the storage units 12 and 22, respectively. The processing described below is an example of processing that is executed by the function blocks illustrated in FIG. 3.

As illustrated in FIG. 11, first, the control unit 11 on the user terminal 20 transmits a display request to display a registration screen for executing user registration to the service providing systemic (Step S1). The registration screen displays, for example, an input form for inputting a plurality of items of user information required for user registration. The display request to display the registration screen is transmitted at discretionary timing, for example, at the time when the URL of the registration screen is selected.

In the service providing system 1c, the control unit 11c receives the display request and transmits display data of the registration screen to the user terminal 20 (Step S2). The display data may have any data format and is, for example, HTML data. The display data of the registration screen is stored in advance in the storage unit 12c.

On the user terminal 20, the control unit 21 receives the display data and displays the registration screen on the display unit 25 based on the display data (Step S3). When the registration screen is displayed in Step S3, the user operates the operation unit 24 to input the eight items of user information shown in FIG. 8. The control unit 21 transmits, to the service providing system 1c, the plurality of items of user information input by the user from the operation unit 24 (Step S4). Not all of the eight items are required to be input, and the input of some items may be omitted.

In the service providing system 1c, the control unit 11c receives the user information and determines whether a card number input by the user is stored in the blacklist BLc of Service C (Step S5). In Step S5, the control unit 11c searches the blacklist BLc of Service C with the card number input by the user as a query.

When it is determined that the card number is stored in the blacklist BLc (Step S5: Y), the control unit 11c estimates that the user is fraudulent, and restricts user registration (Step S6). In Step S6, the control unit 11c rejects the user registration and imposes a restriction so that the user is inhibited from using the service. In this case, a message to the effect that "this card number is unusable for user registration" may be displayed on the user terminal 20. To give another example, the control unit 11c may withhold the completion of user registration and transmit a notification to the administrator of Service C to inquire about whether the user registration is to be permitted. In this case, the user registration is granted when the administrator of Service C gives permission.

When it is determined that the card number is not stored in the blacklist BLc (Step S5: N), on the other hand, the processing proceeds to steps in FIG. 12, and the control unit 11c requests each of the service providing systems 1a and 1b to execute comparison processing for comparing the card number input by the user (Step S7). As a way to issue the request for the comparison processing, the transmission of data in a predetermined format is sufficient, and the data is to include the card number input by the user.

In the service providing system 1a, the control unit 11a receives the card number and, based on the user database DB1a, obtains card numbers of fraudulent users whose user IDs are stored in the blacklist BLa of Service A (Step S8). In Step S8, the control unit 11a obtains card numbers of fraudulent users of Service A.

The control unit 11a compares the card number input by the user in Service C and the card numbers of the fraudulent users in Service A (Step S9). In Step S9, the control unit 11a determines whether there is a match between the card numbers.

The control unit 11a transmits the result of the comparison in Step S9 to the service providing system 1c (Step S10). In Step S10, the control unit 11a transmits a comparison result indicating that the card number is a match, or a comparison result indicating that the card number is not a match, based on the result of the processing of Step S9. That is, the control unit 11a transmits a comparison result indicating whether there is a fraudulent user whose card number is a match.

In the service providing system 1b, on the other hand, the control unit 11b receives the card number and, based on the user database DB1b, obtains card numbers of fraudulent users whose user IDs or device IDs are stored in the blacklist BLb of Service B (Step S11). In Step S11, the control unit 11b obtains card numbers of fraudulent users of Service B.

The control unit 11b compares the card number input by the user in Service C and the card numbers of the fraudulent users in Service B (Step S12). In Step S12, the control unit 11b determines whether there is a match between the card numbers.

The control unit 11b transmits the result of the comparison in Step S12 to the service providing system 1c (Step S13). In Step S13, the control unit 11b transmits a comparison result indicating that the card number is a match, or a comparison result indicating that the card number is not a match, based on the result of the processing of Step S12. That is, the control unit 11b transmits a comparison result indicating whether there is a fraudulent user whose card number is a match.

In the service providing system 1c, the control unit 11c receives a comparison result from each of the service providing systems 1a and 1b, and calculates the degree of fraudulence based on the relevance information stored in the relevance information database DB2 and the received comparison results (Step S14). In Step S14, when the card number is a match with a card number in another service, the control unit 11c calculates a value that is obtained by the multiplication of the relevance information about relevance between the card number of Service C and the card number of the other service and the relevance information about relevance between items in the other service, and calculates the sum of values that are obtained by performing multiplication in the described manner, to thereby calculate the degree of fraudulence.

The control unit 11c determines whether the degree of fraudulence is equal to or higher than a threshold value (Step S15). The threshold value is stored in advance in the storage unit 12c. The threshold value may be a fixed value or a variable value.

When it is determined that the degree of fraudulence is equal to or higher than the threshold value (Step S15: Y), the user is estimated to be fraudulent and the processing proceeds to Step S6, in which user registration is restricted. When it is determined that the degree of fraudulence is lower than the threshold value (Step S15: N), on the other hand, the control unit 11c permits user registration (Step S16), and this processing is ended. In Step S16, the user is estimated to be authentic and the user information input by the user is added to the user database DB1c.

According to the fraud estimation system S of this embodiment, the precision of fraud estimation can be raised by estimating fraudulence of a target user based on the relevance information about the relevance of Service A and Service B to Service C and the result of the comparison of a card number of the target user in Service C. The raised precision of fraud estimation enables the prevention of fraudulence by a fraudulent user in Service C and the enhancement of security in Service C. For instance, fraudulence by a fraudulent user can be prevented in Service C even when a card number of a target user is not stored in the blacklist BLc of Service C because, if this card number has been registered by a fraudulent user in Service A or Service B, fraudulence of the target user can be estimated by utilizing the blacklists BLc of Service A and Service B. Prevention of excessively strict security is also accomplished by taking the relevance of Service A and Service B to Service C into account in fraud estimation.

The fraud estimation system S is also effectively raised in the precision of estimating a user's fraudulence and can improve security in Service C even more by basing the estimation of fraudulence of a target user on a plurality of pieces of relevance information each corresponding to the plurality of services, namely, Service A and Service B, and on a plurality of comparison results each corresponding to the plurality of services, namely, Service A and Service B. For instance, with the use of the blacklists BLa and BLb of the plurality of other services, instead of the use of the blacklist of one other service, fraudulence of a target user can be estimated even when the target user is a user who has not committed fraudulence in a specific other service, if the target user has committed fraudulence in a different other service. Further, excessively strict security can effectively be prevented while raising the precision of fraud estimation by taking the relevance information particular to Service A and the relevance information particular to Service B into consideration, because relevance to Service C varies between Service A and Service B.

The fraud estimation system S estimates a user's fraudulence with the use of an item important to Service C, by obtaining the result of comparing a card number, which is a blacklist item, of a target user in Service C. Thus, the precision of estimating fraudulence of a user can effectively be raised and security in Service C can be improved even more.

The fraud estimation system S can estimate fraudulence of a user even though the card number, which is an item to be compared, is not a blacklist item of Service A and Service B, by using card numbers that are associated with blacklist items of Service A and Service B, and security in Service C is consequently improved.

The fraud estimation system S takes into account the relevance information about the relevance of blacklist items in Service A and Service B to the card number, to thereby raise the precision of estimating a user's fraudulence effectively and improve security in Service C even more.

The fraud estimation system S estimates fraudulence of a target user based on the relevance information of each of the plurality of blacklist items in Service B, to thereby raise the precision of estimating a user's fraudulence effectively and improve security in Service C even more.

The card number comparison processing is executed in the service providing systems 1a and 1b, and the service providing system 1c obtains the results of the comparison from the service providing systems 1a and 1b, which means that card numbers of Service A and Service B are not transmitted over the network N. Leakage of personal information from Service A and Service B can therefore be prevented. Processing load on the service providing system 1c is lightened as well because the service providing system 1c does not execute the comparison processing.

The fraud estimation system S sets the relevance information based on the result of comparing card numbers of fraudulent users in Service C to card numbers of fraudulent users in Service A and Service B, to thereby raise the precision of estimating a user's fraudulence effectively and improve security in Service C even more.

The fraud estimation system S can also prevent a fraudulent user from starting using a service by estimating fraudulence of a target user when user registration is received.

2. Second Embodiment

The fraud estimation system S according to another embodiment of the present invention (hereinafter referred to as "second embodiment") is described next. The fraud estimation system S according to the first embodiment estimates fraudulence of a target user taking not only the comparison result of card numbers but also the relevance information into account. However, fraudulence of a target user may be estimated without particular consideration to the relevance information. In the second embodiment described below, descriptions on points that are the same as the ones in the first embodiment are omitted.

Functions of the service providing systems 1a and 1b in the second embodiment are the same as the ones in the first embodiment. Some functions of the service providing system 1c, on the other hand, differ from the ones in the first embodiment. For example, the data storage unit 100c may not store the relevance information database DB2. To give another example, the relevance information obtaining unit 104c may not be implemented in the service providing system 1c.

The comparison result obtaining unit 105c obtains the result of comparing a predetermined item of user information of a target user in Service C to the predetermined item of user information of fraudulent users in Service A and Service B, in which fraud estimation is based on user information of another item. In the second embodiment, a case in which the predetermined item is the card number serving as the blacklist item of Service C is described as in the first embodiment. The predetermined item, however, may be an item other than the card number. For instance, the predetermined item may be the name, the address, or other items that are not the blacklist item of Service C. In short, it is sufficient to make sure that an item to be compared in fraud estimation differs from blacklist items in Service A and Service B.

The estimation unit 106c of the second embodiment estimates fraudulence of a target user based on the comparison result obtained by the comparison result obtaining unit 105c. That is, the estimation unit 106c estimates fraudulence of a target user without particular consideration to the relevance information. For example, the estimation unit 106c estimates the target user to be fraudulent when the comparison result indicates that the card number is a match, and estimates the target user to be authentic when the comparison result indicates that the card number is not a match.

The estimation unit 106c may estimate the target user to be fraudulent when a comparison result indicating that the card number is a match is obtained from both of Service A and Service B, or when a comparison result indicating that the card number is a match is obtained from one of Service A and Service B. In short, the estimation unit 106c may estimate a user to be fraudulent when a given number of comparison results or more indicate a match. For instance, when comparison results are obtained from n (n is an integer equal to or larger than 3) services, instead of two services, namely, Service A and Service B, as in this embodiment, the estimation unit 106c may estimate a user to be fraudulent when k (k is an integer equal to or larger than 3 and equal to or smaller than n) or more comparison results indicate a match.

According to the second embodiment, the precision of fraud estimation can be raised by estimating fraudulence of a target user based on the result of comparing a card number of the target user in Service C to card numbers of fraudulent users in Service A and Service B, which do not use the card number as a blacklist item. The raised precision of fraud estimation enables the prevention of fraudulence by a fraudulent user in Service C and the enhancement of security in Service C. For instance, fraudulence by a fraudulent user can be prevented in Service C even when a card number of a target user is not stored in the blacklist BLc of Service C because, if this card number has been registered by a fraudulent user in Service A or Service B, fraudulence of the target user can be estimated by utilizing the blacklist BLa of Service A and the blacklist BLb of Service B.

3. Modification Examples

The one embodiment of the present invention is not limited to the embodiments described above. The one embodiment of the present invention can suitably be modified without departing from the spirit of the one embodiment of the present invention.

[3-1. Modification Example of First Embodiment]

(1-1) For example, although fraudulence of a target user is estimated based on the card number in the embodiments, fraudulence of a target user may be estimated taking an item other than the card number into account as well. That is, the result of comparing pieces of user information of a plurality of items may be used in fraud estimation.

The comparison result obtaining unit 105c obtains the result of comparing the target user's user information of each of a plurality of items in Service C to fraudulent users' user information of each of the plurality of items in Service A and Service B. The method of obtaining an individual comparison result is as described in the first embodiment, and the comparison result obtaining unit 105c transmits user information of each of the plurality of items to each of Service A and Service B to request to execute comparison processing for determining whether there is a match to fraudulent users' user information of each of the plurality of items.

The comparison units 101b of the service providing systems 1a and 1b compare the target user's user information of each of the plurality of items in Service C to fraudulent users' user information of each of the plurality of items in Service A and Service B. The comparison units 101b transmit the result of the comparison for each item separately to the service providing system 1c. The comparison result obtaining unit 105c obtains the comparison result of each of the plurality of items. The plurality of items to be compared are only required to be set down in advance, and may be, for example, a combination of the card number and the address or a combination of the name and the phone number. The number of items to be compared is not limited to two, and may be any number equal to or larger than three.

The estimation unit 106c estimates fraudulence of the target user based on the plurality of comparison results each corresponding to the plurality of items. The estimation unit 106c calculates the degree of fraudulence based on the plurality of comparison results. For example, when the received comparison results indicate a match with respect to a plurality of items, the estimation unit 106c calculates, as the degree of fraudulence, the sum of values that are calculated based on pieces of relevance information of the plurality of items.

In this modification example, a case in which user information of a plurality of items is transmitted to each of Service A and Service B is described. However, user information of different items may be transmitted to different services for a comparison by, for example, transmitting a card number to Service A and transmitting an address to Service B.

According to Modification Example (1-1), fraudulence of a user is estimated based on a plurality of comparison results each corresponding to a plurality of items, to thereby raise the precision of estimating a user's fraudulence effectively and improve security in Service C even more.

(1-2) For example, when fraudulence is estimated with the use of a plurality of items as in Modification Example (1-1), relevance information common to the plurality of items may be used, but relevance information may be set down for each item.

The relevance information database DB2 of this modification example stores relevance information of each of a plurality of items to be compared. The relevance information obtaining unit 104c obtains a plurality of pieces of relevance information each corresponding to the plurality of items. The relevance information obtaining unit 104c refers to the relevance information database DB2 to obtain relevance information for each item to be compared.

The estimation unit 106c estimates fraudulence of a target user based on the plurality of pieces of relevance information. For example, when received comparison results indicate a match with respect to a plurality of items, the estimation unit 106c calculates, as the degree of fraudulence, the sum of values that are calculated based on pieces of relevance information of the plurality of items. The method of calculating the degree of fraudulence is as described in the first embodiment.

According to Modification Example (1-2), when fraudulence of a user is estimated with the use of a plurality of items, the precision of estimating a user's fraudulence is effectively raised by using pieces of relevance information particular to the items, with the result that security in Service C is improved even more.

(1-3) For example, although a case in which fraudulence of a target user in Service C is estimated with the use of user information of fraudulent users in Service A and Service B is described in the first embodiment, user information of authentic users in Service A and Service B may be used to estimate fraudulence of a target user in Service C. In this modification example, a whitelist instead of a blacklist is prepared in each service providing system 1.

The whitelist is a list in which user information about authentic users is stored. In other words, the whitelist is a list storing information with which an authentic user can be identified. An authentic user on the whitelist is not limited in the use of service.

The whitelist may be edited manually by an administrator of the service, or may be edited automatically through analysis performed by the service providing system 1 on a user's activity. Items of user information to be stored in the whitelist (hereinafter referred to as "whitelist items") may be common to all services. In this embodiment, whitelist items set down for a service are items adapted to the service.

The comparison result obtaining unit 105c of this modification example obtains the result of the comparison between user information of a target user in Service C and user information of authentic users in Service A and Service B. The result of the comparison takes any one of a value that indicates a match to user information of an authentic user and a value that indicates no match to user information of any authentic user.

The estimation unit 106c calculates the degree of authenticity of the target user based on the relevance information and the result of the comparison. The degree of authenticity is a concept reverse to that of the degree of fraudulence, and is a numerical value indicating the probability of the user U being an authentic user. A higher degree of authenticity indicates a higher probability at which the user U does not commit fraudulence in Service C.

For example, the estimation unit 106c calculates the degree of authenticity based on the relevance information and the result of the comparison to determine whether the degree of authenticity is equal to or higher than a threshold value. The estimation unit 106c estimates that the target user is authentic when the degree of authenticity is equal to or higher than the threshold value, and estimates that the target user is not authentic when the degree of authenticity is lower than the threshold value.

A calculation expression of the degree of authenticity is stored in advance in the data storage unit 100c. This calculation expression is determined so that the degree of authenticity is higher when the result of the comparison indicate a match and a numerical value indicated by the relevance information is larger. The estimation unit 106c substitutes the relevance information and the result of the comparison in the calculation expression to calculate the degree of authenticity.

According to Modification Example (1-3), fraudulence of a target user in Service C is estimated with the use of whitelists in Service A and Service B, to thereby raise the precision of estimating a user's fraudulence and improve security in Service C even more.

It is sufficient for the comparison result obtaining unit 105c to obtain the result of the comparison to user information of fraudulent users or authentic users in another service, and the comparison result obtaining unit 105c may obtain only any one of the result of the comparison to fraudulent users and the result of the comparison to authentic users, or both of the results. In short, it is sufficient to estimate fraudulence of a target user with the use of at least one of the blacklist and the whitelist in another service.

[3-2. Modification Example of Second Embodiment]

(2) For example, the results of the comparison on pieces of user information of a plurality of items may also be used to estimate fraudulence of a target user in the second embodiment as in Modification Example (1-1). In this case, a user may be estimated to be fraudulent when comparison results of a given number of items or more indicate a match. To give another example, a whitelist may be used to estimate fraudulence of a target user in the second embodiment as in Modification Example (1-3). That is, the comparison result obtaining unit 105c may obtain the result of the comparison to authentic users' user information of a predetermined item in another service. The comparison result obtaining unit 105c does not estimate the target user to be fraudulent when there is a match to user information of an authentic user in another service, and estimates the target user to be fraudulent when there is no match to user information of any authentic user in another service.

[3-3. Other Modification Examples]

(3) For example, the modification examples described above may be combined.

For example, although the user databases DB1a to DB1c are prepared as separate databases for separate services in the case described above, a user database common to all services may be prepared. To give another example, any item may be set as a blacklist item, and an item highly probable to be used when fraudulence is committed in the service may be set as a blacklist item. To give still another example, the number of other services is not limited to two, and there may be only one other service or three or more other services.

To give still another example, although fraudulence is estimated at the time of user registration in the case described above, fraud estimation may be executed at any other timing than user registration. For instance, fraudulence may be estimated when a user actually uses a service after user registration is completed. Fraud estimation may also be executed at, for example, timing specified by the administrator of Service C, not at the time of particular use of the service by the user.

When the service providing system 1c is in affiliation with many services, for example, an item to be compared may not be registered in some of the other services. The service providing system 1c may therefore identify a service in which the item to be compared is registered and request the service providing system 1 of the identified service to execute comparison processing. In this case, information indicating what items of user information are registered in which service is registered in the service providing system 1c.

Although the first embodiment and the second embodiment take estimation of fraudulence of a target user in Service C as an example, fraudulence of a target user in, for example, Service A may be estimated. In this case, the service providing system 1a has the same functions as those of the service providing system 1c described in the first embodiment and the second embodiment, and the service providing system 1c has the same function as that of the comparison units of the service providing systems 1a and 1b. For example, the service providing system 1a transmits user information of a target user who attempts user registration to Service A to the service providing systems 1b and 1c, and obtains comparison results from the service providing systems 1b and 1c. The service providing system 1a calculates the degree of fraudulence based on relevance information about the relevance of Service B and Service C to Service A, and on the result of the comparison of Service A to Service B and Service C, to estimate fraudulence of the target user.

Fraudulence of a target user may also be estimated in, for example, Service B. In this case, the service providing system 1b has the same functions as those of the service providing system 1c described in the first embodiment and the second embodiment, and the service providing system 1c has the same function as that of the comparison units of the service providing systems 1a and 1b. For example, the service providing system 1b transmits user information of a target user who attempts user registration to Service B to the service providing systems 1a and 1c, and obtains comparison results from the service providing systems 1a and 1c. The service providing system 1b calculates the degree of fraudulence based on relevance information about the relevance of Service A and Service C to Service B, and on the result of the comparison of Service B to Service A and Service C, to estimate fraudulence of the target user.

For example, all service providing systems 1 may have the same functions. To give another example, although a blacklist item is set down for each service separately in the case described above, a blacklist item common to a plurality of services may be used. For instance, the card number may be a blacklist item in all of Service A to Service C. In this case, it is sufficient for the comparison units 101a and 101b to obtain user information to be compared with reference to the blacklists, without particularly referring to the user databases DB1a and DB1b. To give still another example, although the fraud estimation system S includes the service providing systems 1a and 1b in the case described above, the service providing systems 1a and 1b may be systems outside the fraud estimation system S.

To give another example, the main functions, which are implemented by the server 10 in the case described above, may be divided among a plurality of computers. The functions may be divided among, for example, the server 10 and the user terminal 20. When the fraud estimation system S includes a plurality of server computers, for example, the functions may be divided among the plurality of server computers. To give still another example, the data that is stored in the data storage units 100a to 100c in the description given above may be stored on a computer other than the server 10.

The invention claimed is:

1. A fraud estimation system, comprising at least one processor configured to:
   set relevance information based on an aggregated count of the number of matches between user information of fraudulent users of a first service and user information of fraudulent users of a second service, such that a numerical value indicated by the relevance information is larger when the aggregated count is higher;
   obtain the relevance information about a relevance between the first service and the second service;
   obtain a comparison result of a comparison between user information of a target user in the first service and user information of a fraudulent user or an authentic user in the second service; and
   estimate fraudulence of the target user based on the relevance information and the comparison result.

2. The fraud estimation system according to claim 1, wherein the at least one processor is configured to obtain a plurality of pieces of relevance information each corresponding to a plurality of other services, wherein the at least one processor is configured to obtain a plurality of comparison results each corresponding to the plurality of other services, and wherein the at least one processor is configured to estimate fraudulence of the target user based on the plurality of pieces of relevance information and the plurality of comparison results.

3. The fraud estimation system according to claim 1, wherein, in the first service, fraudulence is estimated based on user information of a predetermined item, and wherein the at least one processor is configured to obtain a comparison result of a comparison between the target user's user information of the predetermined item in the first service and fraudulent user's or authentic user's user information of the predetermined item in the second service.

4. The fraud estimation system according to claim 1, wherein, in the second service, fraudulence is estimated based on user information of a first item, and
wherein the at least one processor is configured to obtain a comparison result of a comparison between the target user's user information of a second item in the first service and fraudulent user's or authentic user's user information of the second item in the second service.

5. The fraud estimation system according to claim 4, wherein the at least one processor is configured to obtain relevance information about relevance between the first item and the second item in the second service, and
wherein the at least one processor is configured to estimate fraudulence of the target user based on the relevance information about the relevance between the first item and the second item in the second service.

6. The fraud estimation system according to claim 4, wherein, in the second service, fraudulence is estimated based on user information of each of a plurality of first items,
wherein the at least one processor is configured to obtain relevance information about relevance of each of the plurality of first items in the second service, and
wherein the at least one processor is configured to estimate fraudulence of the target user based on the relevance information about the relevance of each of the plurality of first items in the second service.

7. The fraud estimation system according to claim 1, wherein the at least one processor is configured to obtain a comparison result of a comparison between the target user's user information of each of a plurality of items in the first service and fraudulent user's or authentic user's user information of each of the plurality of items in the second service, and
wherein the at least one processor is configured to estimate fraudulence of the target user based on a plurality of comparison results each corresponding to the plurality of items.

8. The fraud estimation system according to claim 7, wherein the at least one processor is configured to obtain a plurality of pieces of relevance information each corresponding to the plurality of items, and
wherein the at least one processor is configured to estimate fraudulence of the target user based on the plurality of pieces of relevance information.

9. The fraud estimation system according to claim 1, wherein, in the second service, a comparison is made between user information of the target user in the first service and user information of a fraudulent user or an authentic user in the second service, and
wherein the at least one processor is configured to obtain a result of the comparison from the second service.

10. The fraud estimation system according to claim 1, wherein the at least one processor is configured to receive user registration in the first service,
wherein the target user is a user who performs the user registration, and
wherein the at least one processor is configured to estimate fraudulence of the target user when the user registration is received.

11. A fraud estimation system, comprising at least one processor configured to:
set relevance information based on an aggregated count of the number of matches between user information of fraudulent users of a first service and user information of fraudulent users of a second service, such that a numerical value indicated by the relevance information is larger when the aggregated count is higher;
obtain the relevance information about relevance between the first service and the second service;
obtain a comparison result of a comparison between target user's user information of a predetermined item in the first service and fraudulent user's or authentic user's user information of the predetermined item in the second service, in which fraudulence is estimated based on user information of another item; and
estimate fraudulence of the target user based on the relevance information and the comparison result.

12. A fraud estimation method, comprising:
setting relevance information based on an aggregated count of the number of matches between user information of fraudulent users of a first service and user information of fraudulent users of a second service, such that a numerical value indicated by the relevance information is larger when the aggregated count is higher;
obtaining the relevance information about a relevance between the first service and the second service;
obtaining a comparison result of a comparison between user information of a target user in the first service and user information of a fraudulent user or an authentic user in the second service; and
estimating fraudulence of the target user based on the relevance information and the comparison result.

13. A non-transitory computer-readable information storage medium for storing a program for causing a computer to:
set relevance information based on an aggregated count of the number of matches between user information of fraudulent users of a first service and user information of fraudulent users of a second service, such that a numerical value indicated by the relevance information is larger when the aggregated count is higher;
obtain the relevance information about a relevance between the first service and the second service;
obtain a comparison result of a comparison between user information of a target user in the first service and user information of a fraudulent user or an authentic user in the second service; and
estimate fraudulence of the target user based on the relevance information and the comparison result.

* * * * *